United States Patent [19]

Hoddinott et al.

[11] 4,159,579
[45] Jul. 3, 1979

[54] STRAND DRYING APPARATUS

[75] Inventors: David C. Hoddinott, Preston; Edwin L. Jette, Jr., Mystic, both of Conn.

[73] Assignee: Crompton & Knowles Corporation, New York, N.Y.

[21] Appl. No.: 895,313

[22] Filed: Apr. 11, 1978

[51] Int. Cl.² .................................................. F26B 13/02
[52] U.S. Cl. .................................. 34/155; 15/306 A; 118/68
[58] Field of Search ................. 34/115, 155, 156, 158, 34/159, 160, 16; 118/65, 68; 15/360 R, 360 A

[56] References Cited

U.S. PATENT DOCUMENTS

| | | |
|---|---|---|
| 2,211,490 | 8/1940 | Braun .................................. 34/156 X |
| 2,597,801 | 5/1952 | Jellinek .............................. 34/155 X |
| 2,871,502 | 2/1959 | Whisnany .......................... 15/306 A |
| 3,809,575 | 5/1974 | Yeo ..................................... 34/15 X |
| 3,959,843 | 6/1976 | Yokota et al. ..................... 34/157 |

Primary Examiner—William F. O'Dea
Assistant Examiner—Harold Joyce

[57] ABSTRACT

Apparatus for drying a continuous advancing strand which apparatus includes a trough with a plurality of spaced grooves extending from openings at the bottom of the trough upwardly along the inside surfaces of the trough. Subatmospheric pressure is created beneath the openings for creating an airflow along the grooves and beneath the strand for drying the surface of the strand. Additionally, a cover with apertures is applied to the trough above the strand.

8 Claims, 6 Drawing Figures

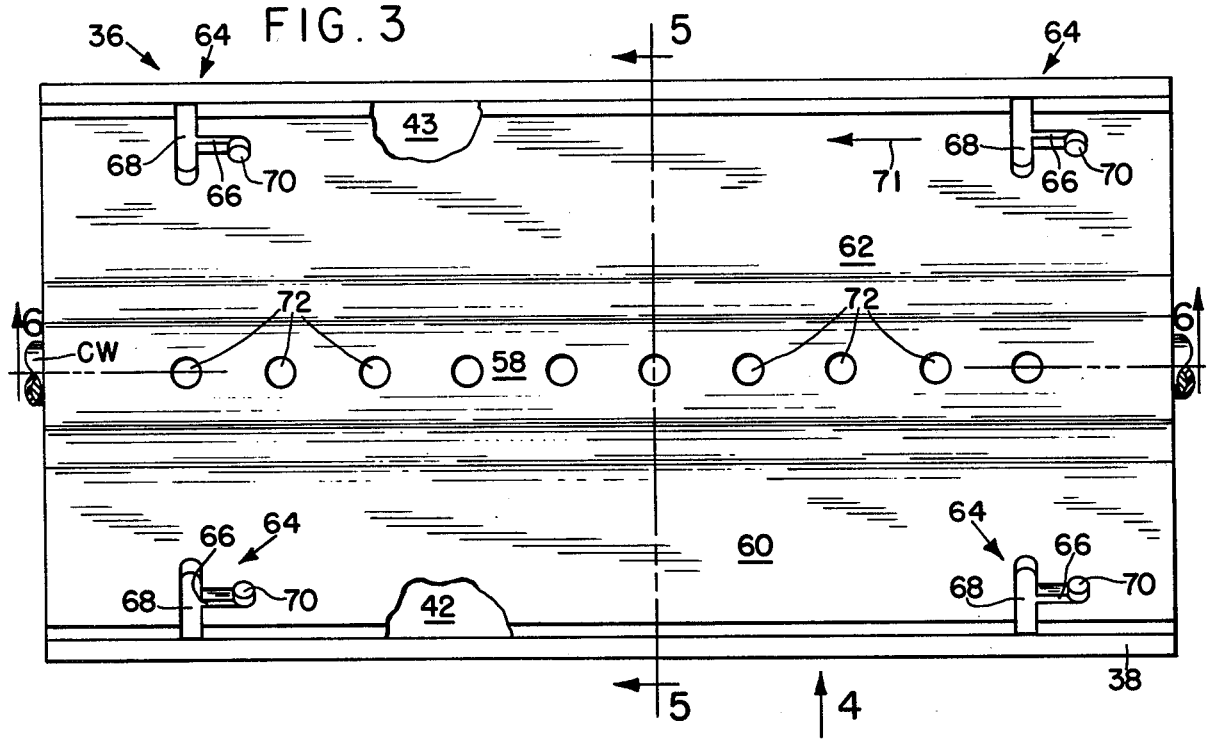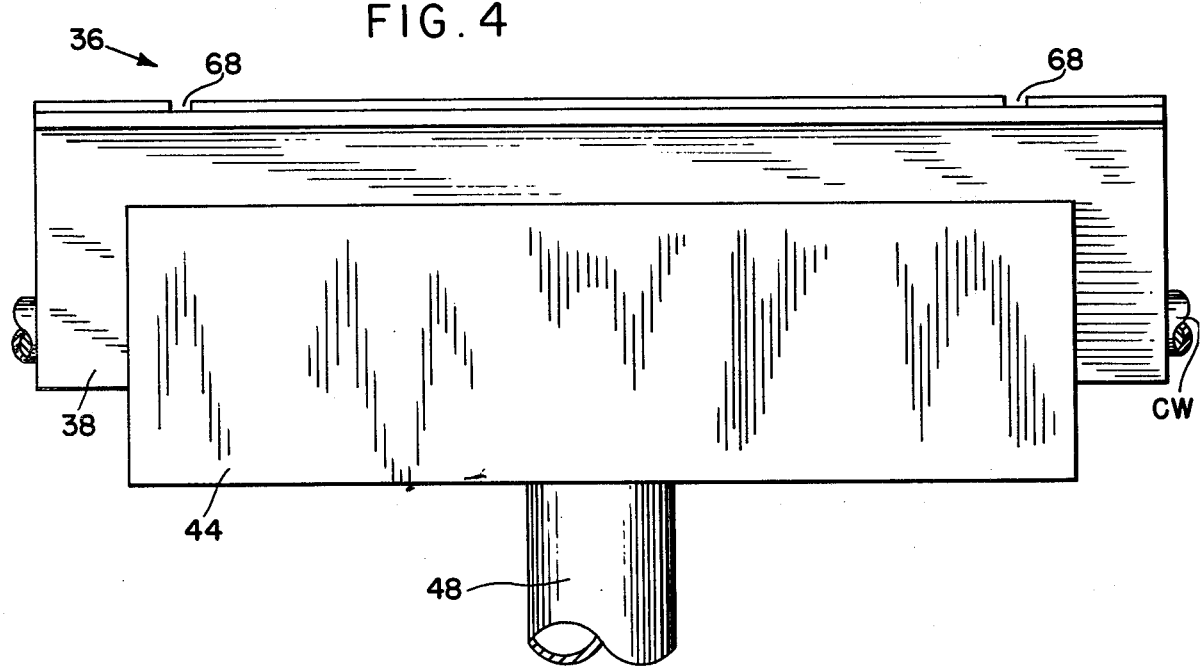

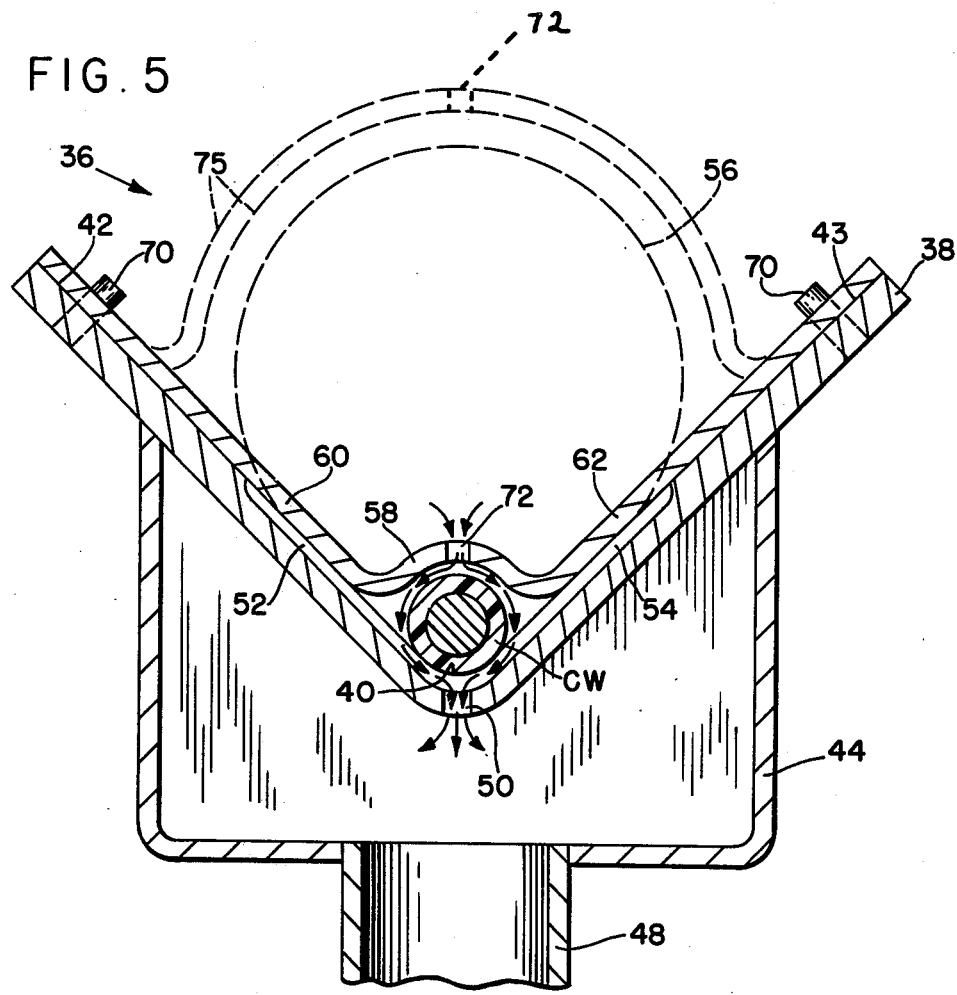
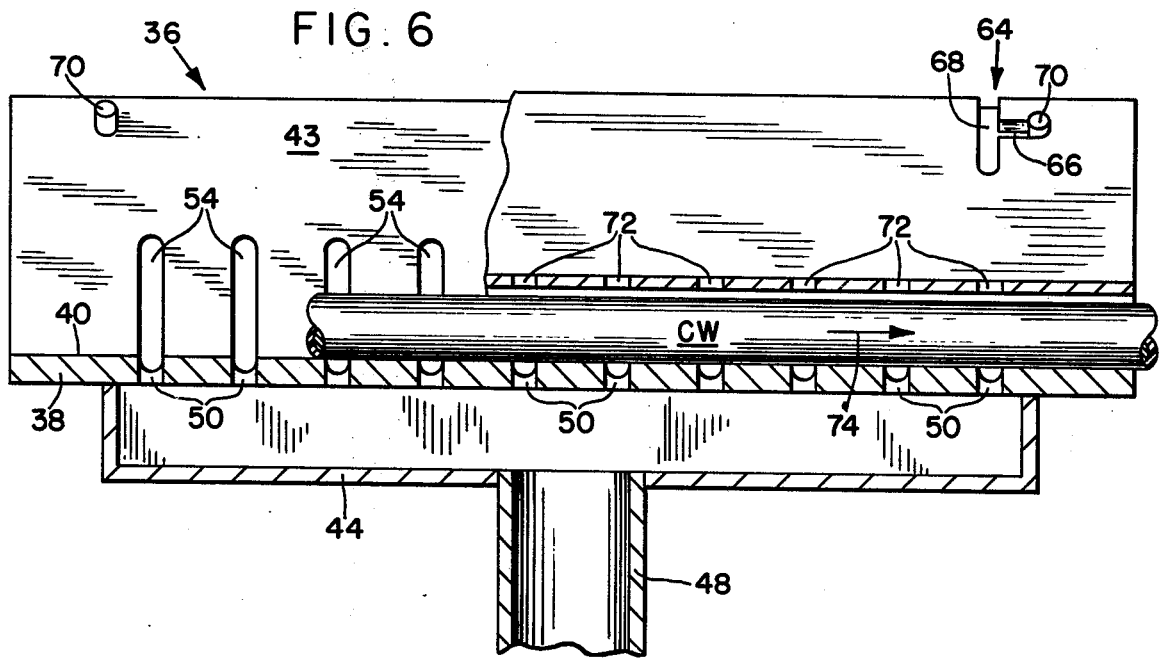

STRAND DRYING APPARATUS

BACKGROUND OF THE INVENTION

The invention relates generally to apparatus for drying wet continuous strand which is advanced along its longitudinal axis. The invention is particularly directed to strand of the type which includes electrical wire coated with a plastic or rubber insulating material from an extruder. The wire is drawn from supply reels through the crosshead of an extruder where molten insulating material is applied to the wire in one or more layers. The coated wire then extends through a cooling trough containing cooling liquid such as water. The cooled, wet insulated wire emerges from the cooling trough and is conveyed through a drying trough to a series of stations, and finally to a winding station where the insulated wire is wound upon spools. Some of the intervening stations may include for example: an electron micrometer, a federal spark tester, a printer, and a measuring machine. Because of these stations it is essential that the insulated wire is completely dry when it leaves the drying trough. The most obvious problem is that caused by dripping water from incompletely dried wire which tends to accumulate into puddles on the floor and causes the reels and take-up machinery to rust. Wet wire also causes inaccurate readings as it passes through other stations such as the electron micrometer and federal spark tester. The most serious problem occurs in the printing station where electrical legends are applied to the wire. The presence of even a small amount of moisture on the wire will seriously impair printing on the surface of the wire.

Cooling troughs of the prior art comprise a V-shaped trough with a plurality of spaced openings at the bottom of the trough. Subatmospheric pressures created beneath the trough draws air around the moving wire through the openings. However, a serious drawback of this drying trough is that the subatmospheric pressure tends to draw the wire toward the openings at the surfaces of the trough and also blocks the openings, thereby restricting the flow of air through the openings. This abrasion of the insulating surface of the wire causes the surface to be scratched or otherwise damaged and the blocking of the openings in the trough by the wire prevents the wire from being completely dry as it emerges from the drying trough. These and other difficulties experienced by the prior art devices have been obviated by the present invention.

It is, therefore, an object of the invention to provide a strand drying apparatus in which the continuous strand material or wire is completely dried as it leaves the apparatus.

Another object of this invention is the provision of a strand drying apparatus in which abrasion of the strand material is substantially reduced.

A further object of the present invention is the provision of strand drying apparatus in which air is circulated around the entire outer periphery of the strand as it passes through the apparatus.

It is another object of the instant invention to provide a strand drying apparatus in which a trough is provided with a cover which conforms substantially to the shape of the strand for concentrating the airflow around the strand to a small area near the outer surface of the strand.

A still further object of the invention is the provision of a cover which locks into operating position on the trough and which is released from this position upon application of a predetermined amount of pressure in the direction of travel of the strand, as for example from a bump or slub extending from the surface of the strand.

With these and other objects in view, as will be apparent to those skilled in the art, the invention resides in the combination of parts set forth in the specification and covered by the claims appended hereto.

SUMMARY OF THE INVENTION

In general, the invention consists of apparatus for drying a continuous strand material such as insulated electrical wire, which is drawn along its longitudinal axis. The apparatus comprises a trough with a plurality of spaced grooves extending from openings at the bottom of the trough, upwardly along the inside surfaces of the trough. A plenum chamber is located beneath the trough and subatmospheric pressure is created in the plenum chamber, thereby drawing air through the openings at the base of the trough. This creates an airflow along the grooves and beneath the strand for drying the surfaces of the strand as it passes through the trough. In addition, a cover is applied to the trough so that it extends above the strand as it passes through the trough. This cover has apertures along the center of the cover which are located in the same vertical plane and the openings at the base of the trough. The cover conforms substantially to the shape of the strand so that the space between the cover and the strand is restricted to a relatively small area, thereby creating an airflow around the entire surface of the strand. The invention also provides for various size covers to be used to accommodate different size strands. Also, means are provided for releasably locking the cover on the trough.

BRIEF DESCRIPTION OF THE DRAWINGS

The character of the invention, however, may be best understood by reference to one of its structural forms, as illustrated by the accompanying drawings, in which:

FIG. 3 is a plan view of the strand drying apparatus of the present invention, FIG. 4 is a side elevational view of the strand drying apparatus looking in the direction of arrow 4 in FIG. 3, FIG. 5 is a vertical section taken along the lines 5—5 in FIG. 3 looking in the direction of arrows, and FIG. 6 is a vertical sectional view taken along the line 6—6 of FIG. 3 and looking in the direction of the arrows.

DESCRIPTION OF THE PREFERRED EMBODIMENT

Figure 1:
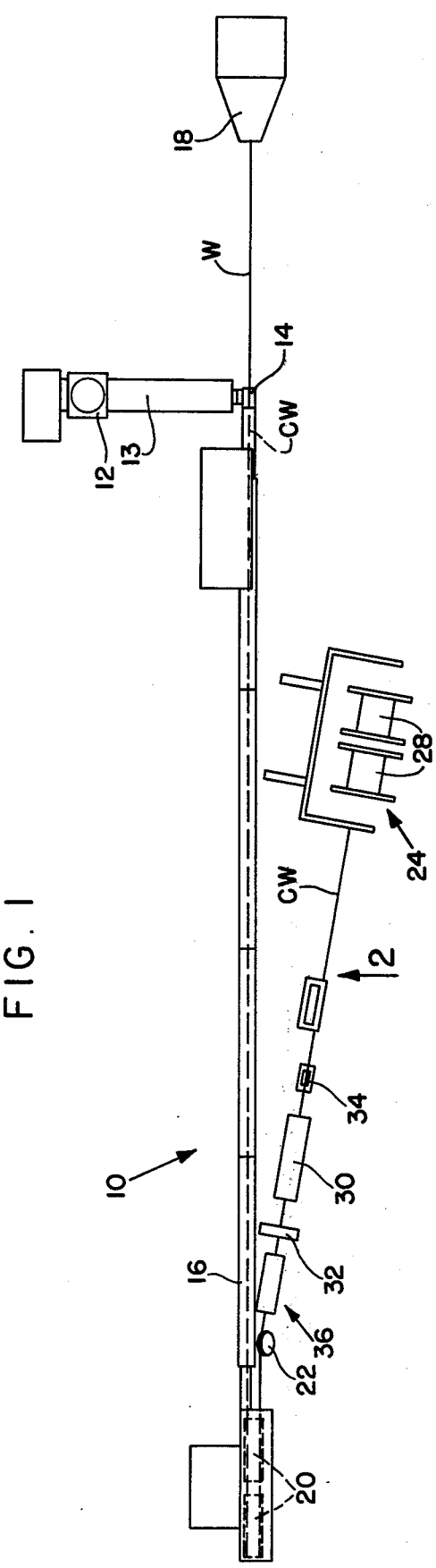
FIG. 1 is a plan view of an electrical wire insulating system to which the present invention is applied.
Figure 2:
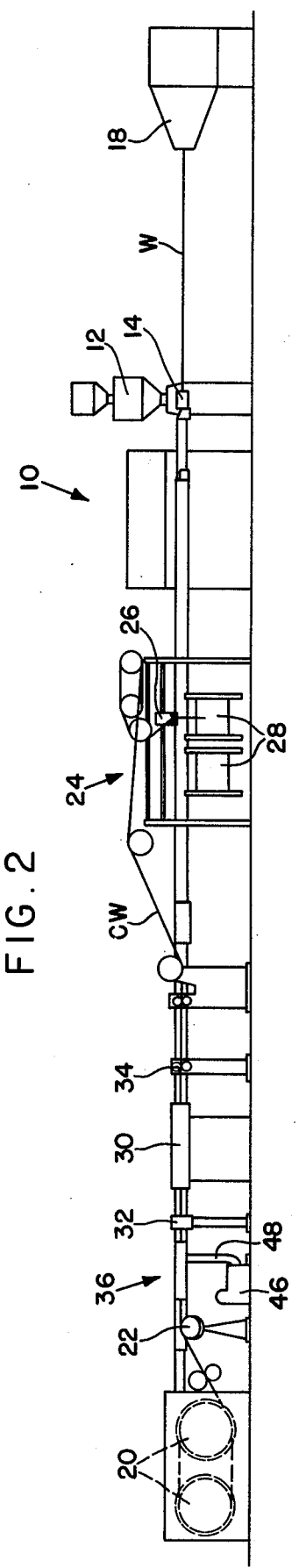
FIG. 2 is an elevational view of the system of FIG. 1 looking in the direction of arrow 2 in FIG. 1.

Referring first to FIGS. 1 and 2, the invention is shown applied to a system for insulating electrical wire. This system is generally indicated by the reference numeral 10 and includes an extruder 12, a crosshead 14 located at the end of the extruder barrel 13 and a cooling trough 16. The electrical wire to be insulated, indicated at W is drawn from a spool 18 and advanced through crosshead 14 where one or more layers of insulating material is applied from the extruder 12. The coated wire, indicated at CW, is then advanced through the cooling trough 16 which is filled with a cooling fluid such as water. The wire is drawn from reel 18 through the elements just described by means of capstans 20.

The coated or insulated wire emerging from the cooling trough 16 makes a 180° turn around the capstans 20 onto a return sheave 22 where it is advanced toward a reeling station generally indicated at 24 comprising the usual traverse guide 26 and spools 28. Before the insulated wire arrives at the spooling station 24, a variety of auxiliary stations may be employed along the advancing path of the wire. These stations include such elements as a federal spark tester 30, an electron micrometer 32, and a printing station 34. The drying trough of the present invention is generally indicated by the reference numeral 36 and is located between the return sheave 22 and the above described auxiliary elements. In this way, the wet wire emerging from the cooling trough 16 is completely dried as it passes through drying trough 36 before it reaches any of the auxiliary elements 30, 32, and 34, or any other additional elements which may be employed depending on the particular nature of the wire or strand material being processed.

Referring to FIGS. 3-6, a strand drying apparatus 36 of the present invention is illustrated in greater detail. Strand drying apparatus 36 comprises an elongated V-shaped trough 38 having a bottom 40 and two surfaces 42 and 43 which extend upwardly from the bottom 40 at an angle. The plenum chamber 44 is attached to the underside of the trough 38. Subatmospheric pressure is created in the plenum chamber 44 by means of a pump 46 connected to the chamber by an air duct 48 (see FIG. 2). There are a plurality of spaced-openings 50 which extend from the bottom of the trough 38 into a plenum chamber 44. Grooves 52 and 54 extend upwardly from each of the openings 50 along surfaces 42 and 43, respectively. Although the grooves 52 and 54 are shown at a right angle to the longitudinal axis of bottom 40, they may extend along their respective surfaces at other angles providing they extend high enough along these surfaces so as to be above the point of tangency between the surfaces 42 and 43 and the largest strand diameter to be treated, indicated by dotted lines 56 in FIG. 5. The coated wire CW also shown in FIG. 5, represents the smallest diameter of wire to be treated by the apparatus shown in the drawings.

A generally arcuate cover 58 is mounted on the trough 38 and positioned just over the space through which the strand or wire to be treated extends during a drying operation. Cover 58 has a pair of legs 60 and 62 which extend along the surfaces 42 and 43, respectively. The cover is fastened to the trough by means of the legs 60 and 62. Located at opposite ends of each of the legs 60 and 62 are releasable locking means generally indicated at 64. Each locking means 64 comprises a first slot 66 in the cover extending along an axis which is parallel to a longitudinal axis of the strand and trough, a second slot 68 in the cover which is at a right angle to and intersects the first slot, and a pin 70 which extends from the adjacent surface of the trough at a right angle to that surface. Cover 58 is first placed on the trough 38 by aligning all of the second slots 68 with corresponding pins 70 and dropping the cover 58 until the legs 60 and 62 make contact with their respective surfaces 42 and 43 of the trough. At this point, the pins 70 will be aligned with their respective first slots 66 at the point where slots 66 and 68 intersect. The cover is then shifted longitudinally in the direction of arrow 71 which is opposite from the direction of strand travel. At the end of this shift, pins 70 will be located in the extreme end portions of slots 66 as shown in FIG. 3 and the cover 58 will be locked against removal in the vertical direction. The locking effect can be best seen in FIG. 5 is due to the fact that the pins 70 extend from surfaces 42 and 43 at a right angle thereto and thereby extend along converging axis, making it impossible for the cover to be lifted away from the trough with a single vertical movement. A plurality of spaced apertures 72 are located along the top of the cover 58. When the cover is locked into this operating position, as shown in FIGS. 3-6, the apertures 72 are vertically aligned with perspective openings 50 in the trough.

During a strand drying operation, the strand (which in the present case is shown as coated wire CW) is drawn along the base 40 of the trough as shown in FIG. 6 in the direction of the arrow 74. Because of the subatmospheric pressure in plenum chamber 44, air is drawn through apertures 72 and is caused to flow around the coated wire CW along the grooves 54 and 52 and through the openings 50 into the plenum chamber 44. This airflow is depicted by the arrows in FIG. 5 which shows that there is airflow around the entire circumference of the coated wire CW. This enables the entire outer surface of the wire to be dried as each portion therof exits from the drying trough.

It can be seen, particularly in FIG. 5, that the arcuate shape of the cover 58 enables the cover to be placed in close proximity with the strand or wire to be dried and thereby restricts the space between the strand and the cover. This concentrates the airflow to an area in close proximity to the strand for maximum drying. Larger covers will, of course, be used when treating larger strands, as shown for example by dotted lines 75 in FIG. 5. This particular size would be used in conjunction with the largest contemplated strand size indicated by dotted lines 56. Covers of varying size would be employed between the two extremes shown in FIG. 5 for accommodating strands or wires to be dried of corresponding varying sizes.

Although the openings 50 are centrally located at the lowest point of bottom 40 for maximum efficiency, it is contemplated that these openings could be at varying points with respect to bottom 40 as long as they are generally beneath the strand material to be dried. Likewise, apertures 72 could be located along various points of the arcuate cover 58 above the strand material to be dried. However, the particular location of the apertures 72 and openings 50 shown in this embodiment, are respectively placed to produce an effective and balanced flow of air around the strand material to be dried.

Releasable locking means 64 represent a safety feature in that they will allow the cover 58 to be released from its locking position with the trough 38 when it is subjected to a force in the direction of strand travel as indicated by arrow 74 in FIG. 6. Occasionally, defects occur on the surface of strand material such as slubs, or unusual bumps which strike or wedge against the close fitting cover 58. If the slub or bump is sufficiently large, the cover will be displaced in the direction of arrow 74, so that slots 68 will be aligned with corresponding pins 70, thereby enabling the cover 58 to be lifted by the bump away from the trough. The strand will thereby continue unhindered through the trough and will not seriously interfer with the advance of the strand or the drying operation itself. Eventually the cover will be returned to its locking position by an operator.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for drying a wet continuous strand which is being advanced along its longitudinal axis comprising:
   (a) an elongated trough member having a bottom and two surfaces extending upwardly from the base at an angle of less than 90° from the horizontal plane which passes through the base,
   (B) a plenum chamber beneath the trough member,
   (c) means for creating subatmospheric pressure in the plenum chamber, and
   (d) a plurality of openings extending through the trough member substantially at the base and into the plenum chamber and at least one groove in at least one of said upwardly extending surfaces for each opening which extends beyond the point at which said surface is substantially tangent with a strand passing through said trough, whereby air is drawn about said wet strand and through said grooves and said openings into said plenum chamber to dry said strand.

2. Apparatus as recited in claim 1, wherein the grooves lie in planes which are perpendicular to the longitudinal axis of the base of the trough.

3. Apparatus as recited in claim 1, comprising a cover which bridges said surfaces at a level above the grooves, said cover having apertures.

4. Apparatus as recited in claim 3, wherein the central portion of the cover is in the form of an arch.

5. Apparatus as recited in claim 3, wherein the central portion of the cover conforms substantially to the shape of the strand.

6. Apparatus as recited in claim 4, wherein said apertures are located in the same vertical plane as said openings, whereby airflow from said apertures to said openings completely encircles a strand passing through the trough.

7. Apparatus as recited in claim 3, comprising releasable locking means for said cover which is effective for maintaining the cover in functional engagement with the trough during normal operation of the drying apparatus and for releasing the cover from engagement with the trough upon application of a predetermined pressure against the cover in the direction of advancement of the strand.

8. Apparatus as recited in claim 7, wherein said releasable locking means comprises:
   (a) a first slot in the cover, the longitudinal axis of said first slot being parallel to the longitudinal axis of the trough,
   (b) a second slot in the cover, the longitudinal axis of said second slot being at a right angle to and intersecting with the first slot, and
   (c) a pin extending upwardly from one of the surfaces of the trough at a right angle to said surface, said pin being aligned with said first and second slots for extending through said slots at the point where said first and second slots intersect to permit the cover to be freely moved vertically relative to the trough, said first slot extending from said point of intersection in the direction of travel of the strand for allowing the cover to be moved in the direction opposite from the direction of travel of the strand to a locking position, said cover being guided in its motion by the pin extending through the the extending portion of the first slot, whereby the cover will be locked against vertical movement when it is in said locking position.

* * * * *